United States Patent [19]
Ruiz, Jr.

[11] Patent Number: 6,126,816
[45] Date of Patent: Oct. 3, 2000

[54] WASTEWATER TREATMENT DEVICE

[76] Inventor: Reuben F. Ruiz, Jr., 9203 Smoke Rock Dr., Baton Rouge, La. 70819

[21] Appl. No.: 09/352,958

[22] Filed: Jul. 14, 1999

[51] Int. Cl.$^7$ .................................................... C02F 3/06
[52] U.S. Cl. ............................ 210/95; 210/151; 210/199; 210/202
[58] Field of Search .................................. 210/615–617, 210/95, 150, 151, 199, 201–203, 218, 220, 257.1, 258

[56] References Cited

U.S. PATENT DOCUMENTS

| | | | |
|---|---|---|---|
| 3,956,128 | 5/1976 | Turner | 210/150 |
| 4,279,753 | 7/1981 | Nielson et al. | 210/615 |
| 4,839,053 | 6/1989 | Tharp | 210/617 |
| 5,064,531 | 11/1991 | Wang et al. | 210/202 |
| 5,227,051 | 7/1993 | Oshima | 210/150 |
| 5,254,246 | 10/1993 | Rivelli et al. | 210/202 |
| 5,389,248 | 2/1995 | Pare et al. | 210/151 |
| 5,750,041 | 5/1998 | Hirane | 210/617 |

*Primary Examiner*—Thomas G. Wyse
*Attorney, Agent, or Firm*—Warner J. Delaune

[57] ABSTRACT

A wastewater treatment device is provided, comprising a first chamber having an influent line for delivering untreated wastewater into the first chamber, wherein the first chamber further includes a first plurality of vertically staggered contact screens below the influent line; a second chamber, fluidically connected to the first chamber by a first transfer conduit for delivering wastewater from the first chamber into the second chamber, wherein the second chamber further includes a second plurality of contact screens; a third chamber, fluidically connected to the second chamber by a second transfer conduit for delivering wastewater from the second chamber into the third chamber, wherein the third chamber further includes an alkaline polish medium; an aeration device disposed within the first chamber for distributing air into the wastewater in the first chamber; and a bioliquid distribution device, fluidically connected to the influent line, comprising a liquid containing select bacteriological and enzymatic agents, for stimulating digestion and degradation of undesirable compounds in the wastewater.

9 Claims, 5 Drawing Sheets

WASTEWATER TREATMENT DEVICE

BACKGROUND OF THE INVENTION

I. Field of the Invention

The present invention relates generally to the treatment of wastewater, and more particularly to the aerobic treatment of such wastewater using a plurality of chambers in series augmented by the introduction of select biological and enzymatic agents.

II. Description of the Problems and Prior Art

The rapid advance of industrial technology has added new concerns for the wastewater field. Chemical compounds of increased complexity and quantities are being discharged into sewers and waterways by industry, municipalities and other commercial businesses. The impact of these waste discharges on water and wastewater treatment processes is harmful in some cases and unknown in others. As the effects of these chemicals on health and the environment becomes more understood, existing treatment methodologies must be adapted to counter their negative impact.

In the field of wastewater treatment, most treatment processes have several common goals. Specifically, such goals often comprise: (1) the neutralization or degradation of certain harmful chemical and/or biological matter, (2) the reduction of sludge as a by-product of the treatment process itself, (3) the reduction of gaseous odors, such as those from methane, ammonia and hydrogen sulfide, and (4) the reduction in cost of products and services used to implement treatment processes. Understandably, each of the aforementioned goals are highly interrelated to one other, as the achievement of one goal often means the sacrifice to some extent of one or more other goals. In addition, the satisfaction of each of these goals is largely dependent upon a number of sub-goals, such as the reduction of total suspended solids, total dissolved solids, biological oxygen demand (BOD), and chemical oxygen demand (COD). For many industries, compliance with stringent regulatory requirements regarding discharge amounts and quality is also of paramount importance.

In the past, there have been numerous attempts to treat varying forms of wastewater by exposing the wastewater to air and introducing biological supplements designed to digest the harmful or undesired waste constituents. While many of those inventions have encountered varying degrees of success, there is a surprising lack of wastewater treatment technology that provides highly effective treatment for a wide range of wastewater constituents. Moreover, few devices are suitable for use in environments which require ease of use, transportability and a small work volume for the device. Consequently, the present invention described hereinbelow satisfies the need for such a device.

SUMMARY OF THE INVENTION

One object of this invention is to provide a wastewater treatment device which includes a multi-stage system for reducing solids entrained within the wastewater.

Another object of this invention is to provide a wastewater treatment device which maximizes the surface area over which the wastewater travels during the treatment period.

It is also an object of this invention to provide a wastewater treatment device which includes the introduction of select microbes and other nutrients into the treatment process.

Still another object of this invention is to provide a wastewater treatment device which effectively reduces undesirable wastewater constituents.

Therefore, in a preferred embodiment, a wastewater treatment device is provided, comprising a first chamber having an influent line for delivering untreated wastewater into the first chamber, wherein the first chamber further includes a first plurality of vertically staggered contact screens below the influent line; a second chamber, fluidically connected to the first chamber by a first transfer conduit for delivering wastewater from the first chamber into the second chamber, wherein the second chamber further includes a second plurality of contact screens; a third chamber, fluidically connected to the second chamber by a second transfer conduit for delivering wastewater from the second chamber into the third chamber, wherein the third chamber further includes an alkaline polish medium; an aeration device disposed within the first chamber for distributing air into the wastewater in the first chamber; and a bioliquid distribution device, fluidically connected to the influent line, comprising a liquid containing select bacteriological and enzymatic agents, for stimulating digestion and degradation of undesirable compounds in the wastewater. It is preferred that the influent line include a diffuser for evenly distributing the wastewater onto the contact screens of the first chamber. In addition, each of first and second chambers should include at least one vent for permitting vapors within the chambers to escape. Although not required, colonization of resident bacteria within the first and/or second chambers may be assisted by the addition of high-surface area structures and/or organic fabric suspended within the wastewater.

Optionally, the invention further comprises a second aeration device disposed within the second chamber for distributing air into the wastewater in the second chamber, wherein the second aeration device includes an auxiliary conduit fluidically connected to the third chamber. Also optionally, the second chamber includes a sight tube fluidically connected thereto for observing the level and visual quality of the wastewater in the second chamber. All chambers include a removable cover for maintenance purposes, as well as drain ports for periodic cleaning.

DETAILED DESCRIPTION OF THE INVENTION

Figure 1A:
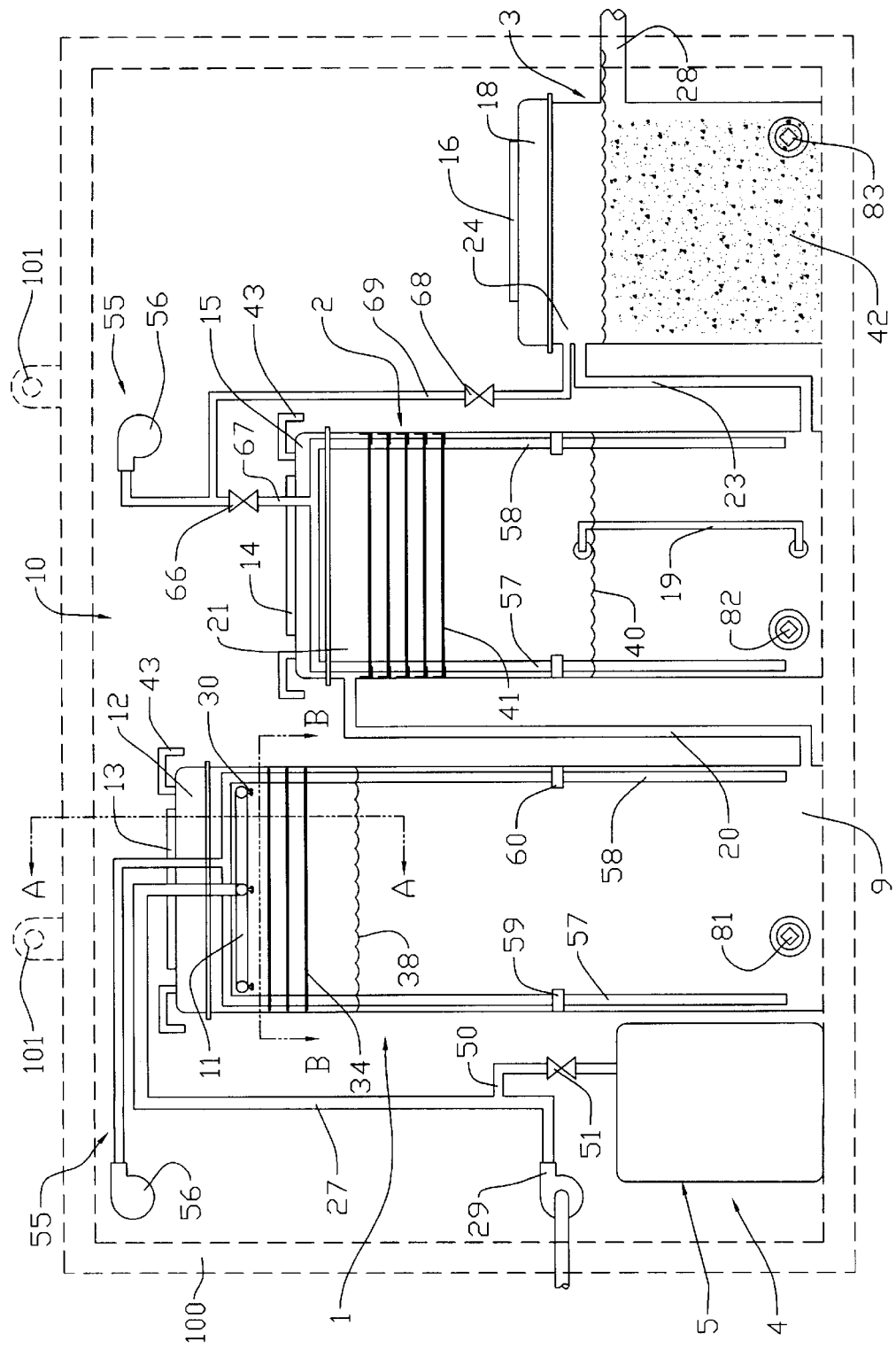
FIG. 1A is an elevation view of a preferred embodiment of the invention depicting the major components of a wastewater treatment device.

Turning now to FIG. 1A, a cross-sectional elevation view of a wastewater treatment device 10 is shown to generally comprise a first fermentation chamber 1, a second trickle chamber 2, and a third polish chamber 3. A bioliquid vessel 4 containing a bioliquid 5, as will be explained in further detail herein, is located preferably adjacent to the fermentation chamber 1. An influent line 27 is fluidically connected to fermentation chamber 1, which delivers untreated wastewater into the device 10, while an effluent line 28 delivers treated wastewater to an external location.

In a preferred embodiment, the fermentation chamber 1, the trickle chamber 2, and the polish chamber 3 are cylindrical tanks constructed from a durable, chemically-resistant and opaque synthetic material, such as plastic. Although fermentation chamber 1 and trickle chamber 2 are sized to accommodate the required flowrate for the treatment system, a common volume for both tanks for a typical system is approximately 850 gallons, while a common volume for polish chamber 3 is approximately 300 gallons. Fermentation chamber 1 is fluidically connected to trickle chamber 2 via two transfer conduits 20 which extend from the bottom 9 of fermentation chamber 1 to the top 21 of trickle chamber 2. Conduits 20 allow wastewater residing within fermentation chamber 1 to be transferred to trickle chamber 2, wherein the height of the conduits 20 as they enter trickle chamber 2 control the operating height of the wastewater within fermentation chamber 1. Similarly, a second pair of transfer conduits 23 fluidically connects the bottom 22 of trickle chamber 2 with the top 24 of the polish chamber 3. Conduits 23 allow wastewater residing within trickle chamber 2 to be transferred to polish chamber 3, wherein the height of the conduits 23 as they enter polish chamber 3 control the operating height of the water within trickle chamber 2. All three chambers include removable covers 12, 15, 18 which are sealably connectable to fermentation chamber 1, trickle chamber 2, and polish chamber 3, respectively, each cover 12,15,18 having an access port 13,14,16 formed therein. Effluent line 28 is fluidically connected to polish chamber 3 and delivers treated wastewater at a height lower than the height 24 at which conduits 23 enter polish chamber 3. Finally, each of the chambers includes a drainage port 81,82,83 near the bottommost portion of the chambers so that the chambers may be washed periodically.

Figure 2:
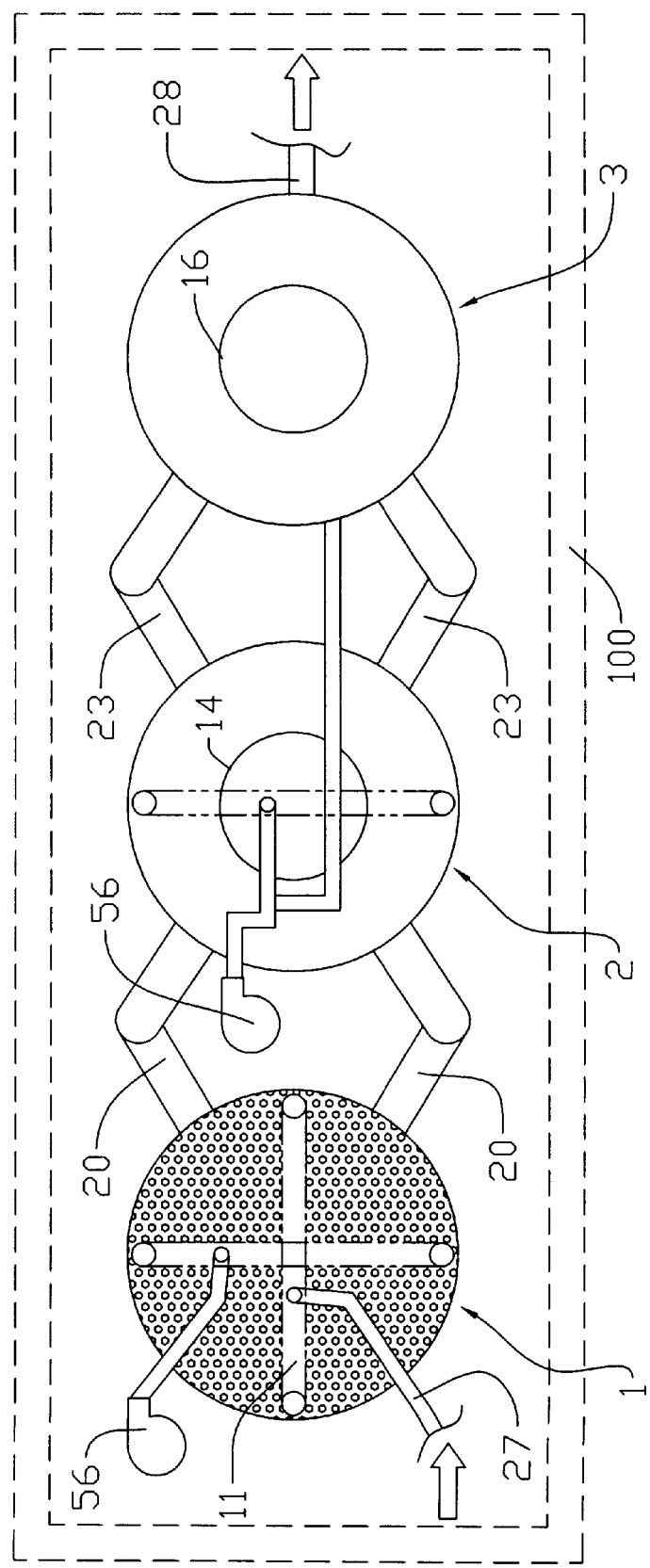
FIG. 2 is a top partial cross-sectional view taken along Section B—B of FIG. 1 to illustrate the location of various internal components of the invention.

Influent line 27 preferably includes a pump 29 which feeds untreated wastewater to fermentation chamber 1. Because the flow of liquid through the device 10 is achieved entirely by gravity, pump 29 is capable of delivering wastewater to the uppermost portion of fermentation chamber 1. As shown more clearly in FIGS. 2 and 3, influent line 27 preferably enters fermentation chamber 1 from the top at cover 12 and extends downward to form a T-section 11. A plurality of diffuser nozzles 30 are located along T-section 11 and directed downward to evenly or uniformly disperse untreated wastewater into fermentation chamber 1.

Fermentation chamber 1 further includes a plurality of contact screens 34 which extend substantially from wall to wall. Each contact screen 34 is formed of perforated rigid plastic sheet, and is removably positioned within fermentation chamber 1 by supporting members 35. Perforations in each screen 34 are approximately 3/16" in diameter and spaced from one another approximately 1/4" in both directions. As will be further explained herein, the large surface area of the contact screens 34 ensures that the wastewater will be in contact with as many microbial organisms as possible as it travels from the diffuser nozzles 30 into the fermentation chamber 1, while the number and size of perforations permits the required flow rate through the device 10. One or more vents 43, in the form of inverted U-shaped tubes, are located on cover 12 of fermentation chamber 1 to vent off any gases produced through the consumption of waste constituents by the resident microbes. As referred to previously, a removable access port 13 having a seal therewith is located on the top 12 of fermentation chamber 1 to provide access to the internal components of fermentation chamber 1 for maintenance purposes.

Figure 3:
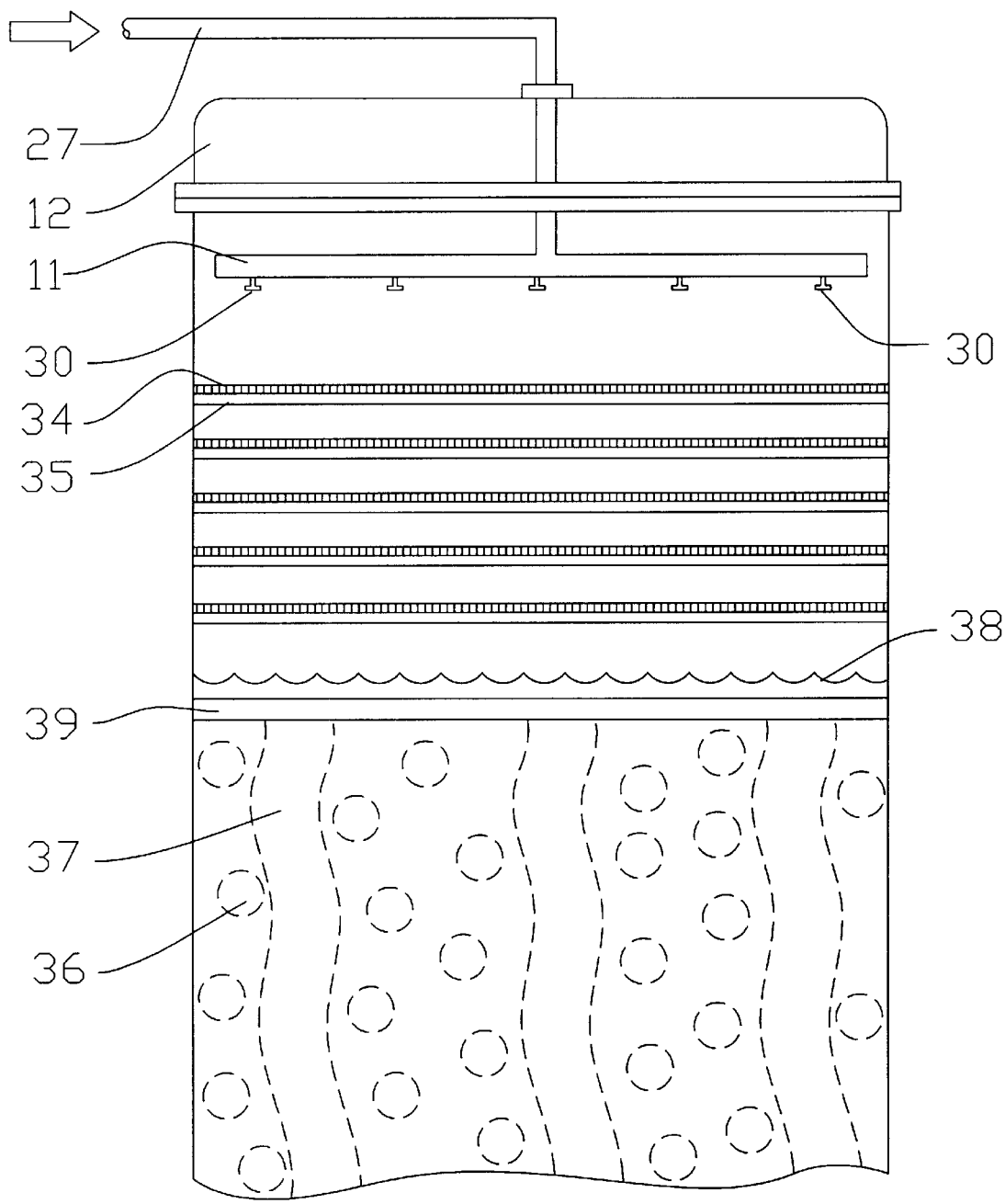
FIG. 3 is a side cross-sectional view taken along Section A—A of FIG. 1 to show the orientation of the influent line and screens within the fermentation chamber.
Figure 4:
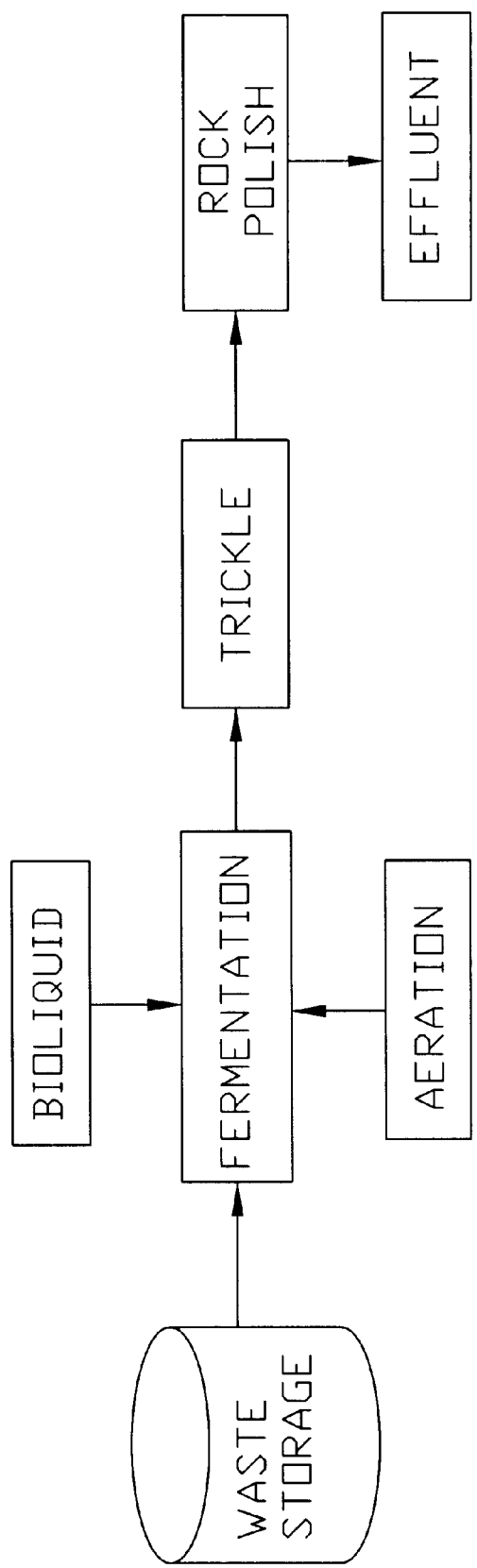
FIG. 4 is a flowchart chart showing the process steps employed by the present invention.

Optionally, fermentation chamber 1 may further include a plurality of high-surface-area structures, or "bioballs" 36, as well as a plurality of organic fabric strips, or "biolap" 37. This is depicted in FIG. 3 with the aeration means 55 removed for clarity. In the case of the bioballs 36, such structures are intended to provide a high amount of surface area for the microbes to colonize, while not significantly obstructing the flow of liquid through the fermentation chamber 1. Such bioballs 36 are commonly available, and their function is well known to those of ordinary skill in the art. The biolap 37 is an organic fabric, such as that derived from common burlap sacks, which also provides a surface upon which the microbes may colonize. If bioballs 36 are used, they may simply be placed into the fermentation chamber 1 to a height just below the operating water level 38 of the fermentation chamber 1, and they may be prevented from entering conduits 20 by a simple screen (not shown). If biolap 37 is used, it may be attached to and suspended from a rod 39 or other structure attached across the width of the fermentation chamber 1 as shown in FIG. 3.

Similar to fermentation chamber 1, trickle chamber 2 further includes a plurality of contact screens 41, identical to those previously described, so that the wastewater may further benefit from contact with microbes colonizing contact screens 41. Wastewater trickles down through the contact screens 41 and is exposed to air as it falls to the operating water height 40 of trickle chamber 2. Preferably, trickle chamber 2 further includes a sight tube 19 extending substantially across the operating water height 40 so that the level and visual quality of the water can be easily observed.

Polish chamber 3 preferably includes an alkaline polish medium 42 to adjust the pH of the wastewater prior to leaving through effluent line 28. The term "polish" is used herein to mean that wastewater entering polish chamber 3 will be further treated to reduce or eliminate contaminants, resulting in a cleaner effluent. For example, limestone, preferably about three-inches (3") in size, may be used as the polish medium 42 for many forms of industrial wastewater to increase the pH of the acidic wastewater before it is discharged to the environment. Raising the pH of the treated wastewater from an acidic state to a more neutral state assists in the further degradation of certain contaminants by the chemical reactions which take place as a result of pH changes. By way of example, some toxic substances, such as PCB's (polychlorinated hydrocarbons) and PAH's (polyaromatic hydrocarbons), will be further reduced, because they are susceptible of degradation by fluctuations in pH.

To facilitate the aerobic digestion of the wastewater constituents, an aeration means 55 is placed within both the fermentation chamber 1 and the trickle chamber 2. Although aeration means 55 may comprise a variety of forms, a preferred embodiment is shown in FIG. 1A as including an air blower 56 which directs forced air through aeration conduits 57,58. By way of example, and not by way of limitation, it has been found that a stronger air blower 56 is required for aeration of the fermentation chamber 1 than the remaining two chambers 2,3 because of the increased biochemical oxygen demand (BOD) of the wastewater in that chamber. For example, in a prototype of the invention, a 4.5 Hp blower was employed for the fermentation chamber 1, in comparison to a 2.5 Hp blower for the combination of the trickle chamber 2 and the polish chamber 3. Aeration conduits 57,58 extend into each of fermentation chamber 1 and trickle chamber 2 such that air is caused to exit near the bottom of the respective chambers. Preferably, aeration conduits 57,58 each include a screen (not shown) near the air exit for creating very fine bubbles, thus maximizing the amount of oxygen which is transferred to the wastewater. In this embodiment, brackets 59,60 are attached to the inside surface of the chambers to retain the aeration conduits 57,58 from undesirable movement. In this manner, air is passed through the entire height of the wastewater within each chamber. In the experience of the inventor, it is desirable to maintain a level of dissolved oxygen (DO) in the wastewater of at least 2.8 mg/cm$^3$ at all times during the residency of the water within the system.

Figure 1B:
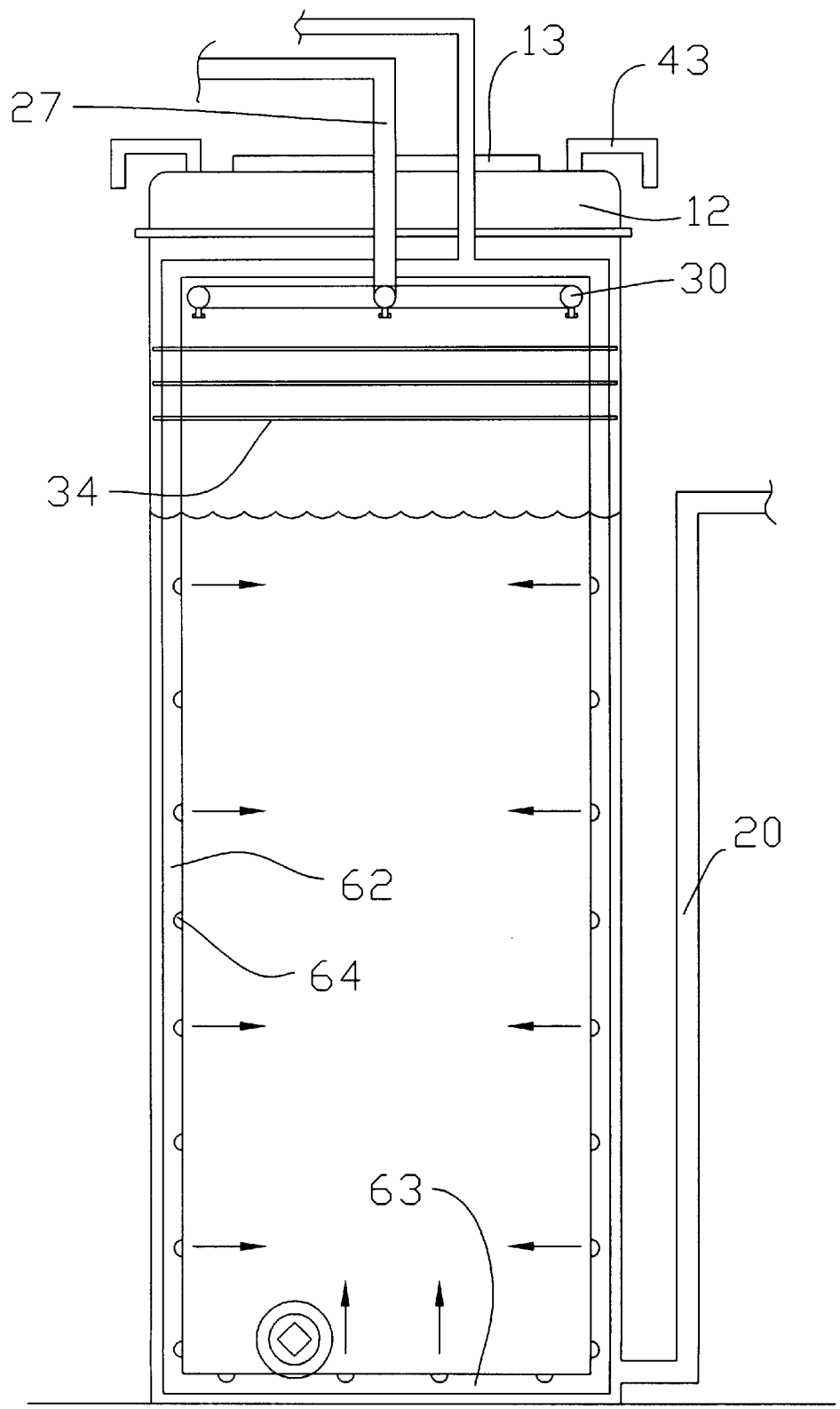
FIG. 1B is an elevation view depicting an alternate embodiment of the aeration means.

As an alternative to the aeration conduits 57,58 shown in FIG. 1A, the aeration means 62 of FIG. 1B employs a closed loop of conduit 63 having a plurality of spaced apart holes 64, preferably about 0.25" in diameter, formed therein. In this arrangement, the two primary advantages are that air is directed at every level of the wastewater column as indicated by the arrows, and the conduit 62,63 is stable without the need for brackets. No brackets are required, because the horizontal portion of the conduit 63 maintains the position of the aeration conduit 62 within the fermentation chamber 1 or the trickle chamber 2, as the case may be.

In the case of the trickle chamber 2 and polish chamber 3, it may be desirable to exert greater control over the amount of dissolved oxygen in the treated water. Therefore, a first valve 66 is positioned along the aeration conduit 67 leading into the trickle chamber 2, and a second valve 68 is positioned along the auxiliary aeration conduit 69 leading into the polish chamber 3. In this manner, one can control the addition of oxygen to prevent any harmful aerobic bacteria that might otherwise thrive in these chambers due to high DO levels passing over from fermentation chamber 1.

Bioliquid vessel 4 is preferably a strong plastic container which contains a "bioliquid" comprising an aqueous solution of select bacteriological agents, various natural extracts, enzymes and micronutrients for resident microbes to flourish during the treatment of the wastewater. More particularly, the nutrients contained in the bioliquid are intended to promote the proliferation of aerobic bacteria. Bioliquid is added to the wastewater influent stream 27 by way of bioliquid conduit 50 through a pump (not shown) or by suction from the influent stream 27, and its flow may be controlled by valve 51. The exact formulation of the bioliquid depends heavily upon the precise nature and proportions of the wastewater to be treated. However, it can stated in general that those microbes which are capable of consuming hydrocarbons, such as benzene, toluene, xylene (BTEX) should be a primary component of the bioliquid if those contaminants are to be removed. Similarly, wastewater constituents composed mainly of ammonia would require a bioliquid comprising microbes with an affinity for consuming that type of waste. Broadly speaking, the bioliquid is delivered to the fermentation chamber 1 in proportion to the influent flow rate. As a practical matter, one may assume for some purposes that the waste flow rate into the fermentation chamber 1 is constant, and the bioliquid can be pumped on an intermittent basis at predetermined intervals of time. Alternatively, the bioliquid may be added on a constant basis. In any case, the amount of bioliquid added to the wastewater is a function of the concentration of waste constituents in the wastewater. The wastewater leaving effluent line 28 should be monitored by conventional sampling techniques so that high levels of waste can be handled by the addition of more bioliquid, or by reformulating the bioliquid to consume greater amounts of waste. Ideally, the microbe mixture will support complete consumption of the available food supply in the wastewater. For example, the bioliquid used for a commercial brewery discharging to the a collection system will be different from that used in an ordinary residential area. The bioliquid used in restaurant areas will be geared for significant oil and grease loads, and bioliquid in the area of a bakery will be adjusted for carbohydrate reduction. Therefore, the precise microbes used and the precise ratios of such microbes in the bioliquid may be determined through routine laboratory experimentation using representative samples of the wastewater.

The compounds that are present in the bioliquid should allow for certain chemical reactions to proceed at higher rates than would be the case in the absence of the bioliquid. This increased rate of reaction is determined by the concentration of bioliquid used, as well as by the chemical compounds desired to be reduced. This effect is largely the result of enzyme catalyzed reactions. In all enzyme catalyzed reactions, the first step is the binding of the substrate (typically the undesirable wastewater constituent) to the enzyme to form an enzyme-substrate complex. The second step involves the conversion of the enzyme-substrate complex to a new product and the release of the enzyme. It is preferred that the bioliquid contain trace elements, such as metalloenzymes, which serve as supplemental catalysts that allow for the reduction of a broad spectrum of wastewater compounds. Generally, the reactions which result in the degradation of the waste are the following:

Oxidation $ArO(CH_2)n\ CH_2CH_2COOH \rightarrow ArO(CH_2)nCOOH$

Deamination $ArNH_2 \rightarrow ArOH$

Dehalogenation $ArX \rightarrow ArOH$ or $ArX \rightarrow ArH$ (where X=Cl, F, I, or Br)

Decarboxylation $ArCOOH \rightarrow ArH$

Hydroxylation $ArH \rightarrow ArOH$

Reduction of unsaturates $ArC=CH \rightarrow ArCH=CH_2$

Hydration $Ar_2C=CH_2 \rightarrow Ar_2CH\ CH_2OH$ where Ar=Aromatic, and wherein Ar could also be alkyl, heterocyclic or other organic moieties usually indicated as R. These and other compounds, such as pepsin and micronutrients are employed to enhance the reaction rates to provide a wide range of benefits from odor control on solid waste and compost facilities to COD, BOD and TDS reduction in wastewater streams from industrial and municipal plants.

In the interest of portability for a wide variety of industrial and municipal applications, the entire system 10 with all of the components previously described is secured to a mobile skid assembly 100 roughly constructed in the shape of a rectangular frame. Skid 100 further includes two or more lifting eyes 101 which can be matably engaged by hooks from a hoist or crane. Thus, the present invention is quite self-contained, and it can easily be positioned in any desired location on an offshore oil rig, a petrochemical site or other industrial or municipal facility having need of wastewater treatment.

Although the present invention has been described in terms of specific embodiments, it is anticipated that alterations and modifications thereof will no doubt become apparent to those skilled in the art. It is therefore intended that the claims be interpreted as covering all such alterations and modifications as fall within the true spirit and scope of the invention.

I claim:

1. A wastewater treatment device, comprising:
   (a) a first chamber having an influent line for delivering untreated wastewater into said first chamber, wherein said first chamber further includes a first plurality of vertically staggered contact screens below said influent line;

(b) a second chamber, fluidically connected to said first chamber by a first transfer conduit for delivering wastewater from said first chamber into said second chamber, wherein said second chamber further includes a second plurality of contact screens;

(c) a third chamber, fluidically connected to said second chamber by a second transfer conduit for delivering wastewater from said second chamber into said third chamber, wherein said third chamber further includes an alkaline polish medium;

(d) aeration means disposed within said first chamber for distributing air into said wastewater in said first chamber; and (e) bioliquid distribution means, fluidically connected to said influent line, comprising a liquid containing select bacteriological and enzymatic agents, for stimulating digestion and degradation of undesirable compounds in said wastewater.

2. The wastewater treatment device of claim 1, further comprising diffusing means on said influent line for evenly distributing said wastewater onto said first plurality of contact screens.

3. The wastewater treatment device of claim 1, further comprising at least one vent on said first chamber and said second chamber.

4. The wastewater treatment device of claim 1, further comprising second aeration means disposed within said second chamber for distributing air into said wastewater in said second chamber.

5. The wastewater treatment device of claim 4, wherein said second aeration means further includes an auxiliary conduit fluidically connected to said third chamber.

6. The wastewater treatment device of claim 1, wherein said second chamber includes a sight tube fluidically connected to said second chamber for observing the level and visual quality of said wastewater in said second chamber.

7. The wastewater treatment device of claim 1, wherein said first, second and third chambers each include a removable cover.

8. The wastewater treatment device of claim 1, wherein said first chamber includes a plurality of high-surface area structures susceptible of colonization by resident bacteria within said first chamber.

9. The wastewater treatment device of claim 1, wherein said first chamber includes an organic fabric susceptible of colonization by resident bacteria within said first chamber.

* * * * *